(12) United States Patent
Tanoue et al.

(10) Patent No.: US 7,172,375 B2
(45) Date of Patent: Feb. 6, 2007

(54) MACHINE TOOL

(75) Inventors: Shinn Tanoue, Yamatokoriyama (JP); Ryuichi Fujiwara, Yamatokoriyama (JP); Toshiaki Kotaka, Yamatokoriyama (JP); Hikaru Ishigaki, Yamatokoriyama (JP)

(73) Assignee: Mori Seiki Co., Ltd., Yamatokoriyama (JP)

( * ) Notice: Subject to any disclaimer, the term of this patent is extended or adjusted under 35 U.S.C. 154(b) by 0 days.

(21) Appl. No.: 11/159,388

(22) Filed: Jun. 23, 2005

(65) Prior Publication Data

US 2006/0291971 A1   Dec. 28, 2006

(51) Int. Cl.
    *B23Q 1/00*   (2006.01)
(52) U.S. Cl. ............... 409/202; 409/212; 409/234; 83/939
(58) Field of Classification Search ........... 409/202, 409/201, 211, 206, 234, 235, 134, 137, 212; 408/234; 83/939, 940, 941
See application file for complete search history.

(56) References Cited

U.S. PATENT DOCUMENTS

| | | | |
|---|---|---|---|
| 5,350,262 A | * | 9/1994 | Michaelis et al. .......... 409/202 |
| 5,786,557 A | | 7/1998 | Girardin |
| 6,068,431 A | * | 5/2000 | Line ...................... 409/202 |
| 6,719,506 B2 | * | 4/2004 | Chang et al. ............. 409/202 |
| 6,798,088 B2 | * | 9/2004 | Hsu et al. ................ 409/202 |

FOREIGN PATENT DOCUMENTS

| | | | |
|---|---|---|---|
| FR | 2 715 336 A | | 7/1995 |
| JP | 8-150534 A | | 6/1996 |
| JP | 2001-219325 A | | 8/2001 |
| JP | 2005262375 A | * | 9/2005 |

* cited by examiner

*Primary Examiner*—Dana Ross
(74) *Attorney, Agent, or Firm*—Smith Patent Office

(57) ABSTRACT

The present invention provides a machine tool realizing high-speed movement of a spindle and thus reducing the machining time without any increase in size of the whole machine. A machining unit 3 by which a spindle 2 with a tool T attached thereto is supported to be relatively movable in X-axis, Y-axis, and Z-axis directions is mounted on a long bed 4 having a plurality of machining areas a1 to a4 arranged in one direction, and the machining unit 3 is movable in the arrangement direction of the machining areas.

4 Claims, 15 Drawing Sheets

MACHINE TOOL

BACKGROUND OF THE INVENTION

1. Field of the Invention

The present invention relates to a machine tool in which a spindle with a tool attached thereto is supported to be relatively movable in X-axis, Y-axis, and Z-axis directions, and more particularly, to a structure of a machine tool capable of machining a wide and long workpiece efficiently.

2. Description of the Related Art

As a gantry-type machining center for machining a relatively long workpiece, there is one described in, for example, Japanese Patent Application Laid-open No. 2001-219325 (patent document 1) or Japanese Patent Application Laid-open No. Hei 8-150534 (patent document 2). The one described in the patent document 1 is structured such that a gate-shaped column 7 is disposed on a long bed 2 to be movable in an X-axis direction, a saddle 25 is disposed on a front face of a cross rail 7c of a column 7 to be movable in a Y-axis direction, a ram 30 is disposed on the saddle 25 to be movable in a Z-axis direction, and a spindle 31 with a tool 32 attached thereto is disposed on the ram 30.

In a machining center of this type, a relatively long workpiece W is placed on the bed 2, and then the column 7, the saddle 25, and the ram 30 are relatively moved in the X-axis, Y-axis, and Z-axis directions respectively, and whereby the spindle 31 applies predetermined machining to the workpiece W.

SUMMARY OF THE INVENTION

In the above-described conventional machining center, however, the column having the saddle, the ram, and so on mounted thereon and thus being a heavy object reciprocates in the X-axis direction to move the spindle in the X-axis direction, so that the spindle machines the workpiece. Due to this structure, there is a limit for the spindle to move in the X-axis direction at high speed, and there has been a demand for improvement for reducing the time required for machining. Here, if a table on the bed is moved in the same direction as the movement direction of the column from the viewpoint of realizing higher-speed movement of the spindle (see the aforesaid patent document 2), the bed has to be long enough to correspond to an amount of the movement of the table, which poses a problem of size increase of the entire machine.

Further, in the above-described conventional machine tool, when a wide and long workpiece with a size covering substantially the whole area of a machining table is to be machined, only an outer periphery of the workpiece is fixed and thus a center portion of the workpiece is not fully fixed, which gives rise to a concern that this workpiece fixing method may give an adverse effect to machining accuracy in this center portion.

Moreover, in the above-described machining center, an outer periphery of the machine main body is generally surrounded and shielded by a cover in order to prevent chips and coolant from scattering out of the machine during the machining.

However, in a machine tool for machining a relatively large and long workpiece, if the structure that a cover shields an outer periphery of a machine main body as in the above-described conventional machine tool is adopted, the cover needs to be large since the area to be shielded is large, which poses a problem of cost increase.

It is an object of the present invention to provide a machine tool whose spindle is capable of moving at high speed, thereby realizing reduction in the machining time without increasing the size of the entire machine.

It is another object of the present invention to provide a machine tool capable of ensuring machining accuracy when a wide and long workpiece is machined.

It is still another object of the present invention to provide a machine tool capable of suppressing cost increase of a cover even when a long workpiece is machined.

A first invention includes: a spindle with a tool attached thereto; a machining unit by which the spindle is supported to be relatively movable in X-axis, Y-axis, and Z-axis directions; and a long bed which has a plurality of machining areas arranged in one direction and on which the machining unit is mounted, wherein the machining unit is movable in the arrangement direction of the machining areas.

According to one preferable embodiment of the first invention, the spindle is moved in the X-axis, Y-axis, and Z-axis directions while the machining unit is kept positioned in one of the machining areas, thereby machining a workpiece.

In the first invention, the machining unit by which the spindle is supported to be relatively movable in the X-axis, Y-axis, and Z-axis directions is movable in the arrangement direction of the machining areas. Therefore, for example, as in the above-described preferable embodiment, the whole machining unit is moved to and positioned in one of the machining areas on the bed and the spindle supported by the machining unit is relatively moved in the X-axis, Y-axis, and Z-axis directions, thereby machining the workpiece. In this machining of the workpiece, the whole machining unit is not moved but the spindle is moved in the X-axis, Y-axis, and Z-axis direction, so that it is possible to reduce moving weight at the time of machining by the spindle. This allows the spindle to move at high speed compared with the conventional case where the whole column is moved for workpiece machining, which accordingly reduces the machining time.

According to another preferable embodiment of the first invention, the machining unit is disposed on the bed to be bridged over a machining table and supports the spindle with an axis of the spindle being set substantially vertical.

In this embodiment, the machining unit is disposed on the bed to be bridged over the machining table and supports the spindle vertically. This structure makes this invention applicable to a vertical machining center.

According to still another preferable embodiment of the first invention, the machining unit includes: a gate-shaped column in which, when seen in the arrangement direction of the machining areas, right and left column main bodies disposed on the bed are coupled by front and rear cross frames; a cross rail in a rectangular shape in a plane view disposed in a space surrounded by the front and rear cross frames and the right and left column main bodies and supported to be movable in the X-axis or Y-axis direction; a cylindrical saddle supported to be movable in the Y-axis or X-axis direction in the cross rail; and a ram supported to be movable in the Z-axis direction in the saddle, wherein the spindle is attached on a lower end portion of the ram.

In this embodiment, the machining unit is constituted of the gate-shaped column in which the right and left column main bodies are coupled by the front and rear cross frames, the cross rail in the rectangular shape is disposed in the space inside the column, the cylindrical saddle is disposed in the cross rail, and the ram is disposed in the saddle. This structure can enhance rigidity of supporting the spindle, which can realize higher machining accuracy as well as higher speed of the spindle, and further makes it possible to set a machining stroke of the spindle large.

According to yet another preferable embodiment of the first invention, the machining unit is disposed on the bed to face a machining table from a side and supports the spindle with an axis of the spindle being set substantially horizontal.

In this embodiment, the machining unit is disposed on the bed to face the machining table from the side and the spindle is supported horizontally. This structure makes this invention applicable to a horizontal machining center.

According to yet another preferable embodiment of the first invention, the machining unit includes: a rectangular column in which, when seen in the arrangement direction of the machining areas, front and rear column main bodies disposed on the bed are coupled by upper and lower cross frames; a cross rail in a rectangular shape disposed in a space surrounded by the upper and lower cross frames and the front and rear column main bodies and supported to be movable in the X-axis direction; a cylindrical saddle supported to be movable in the Y-axis direction in the cross rail; and a ram supported to be movable in the Z-axis direction in the saddle, wherein the spindle is attached on a tip portion of the ram.

In this embodiment, the machining unit is constituted of the rectangular column in which the front and rear column main bodies are coupled by the upper and lower cross frames, the rectangular cross rail is disposed in the column, the cylindrical saddle is disposed in the cross rail, and the ram is disposed in the saddle. This structure realizes higher rigidity of supporting the spindle, so that effects of improved machining accuracy and larger machining stroke can be obtained.

According to yet another preferable embodiment of the first invention, the machining table is turnable between a substantially vertical machining position facing the spindle and a substantially horizontal preparatory position where the workpiece is attached/detached.

In this embodiment, the machining table is turnable between the substantially vertical machining position and the substantially horizontal preparatory position. This structure can realize improved operability when a wide and long workpiece is machined by, for example, a horizontal machining center.

Here, in this embodiment, "the cylindrical saddle" includes saddles in any shape such as a circular cylinder and a square cylinder.

According to a second invention, provided is a machine tool in which a spindle with a tool attached thereto is relatively moved to apply predetermined machining to a workpiece placed on a machining table, the machine tool including: a machining unit by which the spindle is supported to be movable in X-axis, Y-axis, and Z-axis directions relative to the machining table; and a workpiece presser disposed in the machining unit to press and fix the workpiece to the machining table.

In the second invention, the machining unit supporting the spindle has the workpiece presser pressing and fixing the workpiece to the machining table. This structure makes it possible to surely fix the whole workpiece to the machining table, even if the workpiece is a wide and long workpiece, which can ensure machining accuracy.

According to a preferable embodiment of the second invention, the workpiece presser is mounted in the machining unit and includes a plurality of cylinder mechanisms in which piston rods are supported to be reciprocatable by cylinders, and pad members are attached to tip portions of the respective piston rods to press the workpiece while changing mounting posture or shape so as to follow a shape of the workpiece.

In this embodiment, the pad members which change their mounting posture so as to follow the shape of the workpiece are attached to the piston rods of the respective cylinder mechanisms. This structure makes it possible to surely press and fix the workpiece to the machining table even if the workpiece has a slanted face or irregularities.

According to another preferable embodiment of the second invention, the machining table has a plurality of machining areas arranged in one direction; the machining unit is mounted on a long bed extending in the arrangement direction of the machining areas to be movable in the arrangement direction of the machining areas, and moves the spindle in the X-axis, Y-axis, and Z-axis directions while being kept positioned in one of the machining areas, thereby machining the workpiece; and the workpiece presser presses and fixes only a portion of the workpiece corresponding to the machining area.

In this embodiment, while the machining unit is kept positioned in one of the machining areas, the spindle machines the workpiece, so that it is only necessary to press and fix the machining area portion of the workpiece even if the workpiece is wide and long, which allows the workpiece presser to have a small and simple structure compared with a case where the whole workpiece is pressed.

According to still another embodiment of the second invention, the machining unit is disposed on the bed to be bridged over the machining table; a wide and long workpiece having size and shape covering substantially a whole area of each of the machining areas is placed on the machining table; and the cylinder mechanisms are disposed on a beam member of the machining unit, which is bridged over the machining table, to extend substantially vertically downward, thereby pressing and fixing the workpiece vertically downward.

In this embodiment, the cylinder mechanisms are attached on the beam member of the machining unit, which is bridged over the machining table, to press and fix the workpiece to the machining table. This structure makes it possible to surely press and fix a center portion of the workpiece even if the workpiece is a wide and long workpiece having size and shape covering substantially the whole area of each of the machining areas, which can ensure machining accuracy when the center portion is machined.

According to a third invention, provided is a machine tool in which a spindle with a tool attached thereto is relatively moved to apply predetermined machining to a workpiece placed on a machining table, the machine tool including: a machining unit by which the spindle is supported to be movable in X-axis, Y-axis, and Z-axis directions relative to the machining table; and a shielding mechanism provided in the machining unit to prevent chips and coolant from scattering out of a machining area.

In the third invention, the shielding mechanism is provided in the machining unit that movably supports the spindle, so that the shielding mechanism can be downsized, leading to suppression of cost increase compared with a conventional case where the whole outer periphery of the machine main body is shielded.

According to a preferable embodiment of the third invention, the machining unit includes a column in which front and rear end portions of right and left column main bodies disposed on right and left sides of the machining table are coupled by front and rear cross frames; the spindle is disposed in a portion surrounded by the front and rear cross frames and the right and left column main bodies with an axis thereof being set substantially vertical; and the shielding mechanism includes front and rear shielding members hung from the front and rear cross frames to be vertically movable and opening/closing front and rear openings formed by the column main bodies, the cross frames, and the machining table.

In this embodiment, the column is structured such that the front and rear end portions of the right and left column main bodies are coupled by the front and rear cross frames, and the shielding mechanism includes the front and rear shielding members opening/closing the front and rear openings formed by the right and left column main bodies, the cross frames, and the machining table. Therefore, right and left sides of the machining area by the spindle can be shielded by the column main bodies, and it is only necessary to shield the front and rear openings formed by the right and left column main bodies and the front and rear cross frames. This allows the shielding members to be downsized compared with a conventional case where the whole outer periphery of the machine main body is shielded, realizing suppression of cost increase.

According to another preferable embodiment of the third invention, the machining table has a plurality of machining areas arranged in one direction; the machining unit is mounted on a long bed extending in the arrangement direction of the machining areas to be movable in the arrangement direction of the machining areas, and moves the spindle in the X-axis, Y-axis, and Z-axis directions while being kept positioned in one of the machining areas, thereby machining the workpiece; and the front and rear shielding members open/close the front and rear openings while the machining unit is kept positioned in one of the machining areas.

In this embodiment, the shielding members open/close the front and rear openings while the machining unit moved to one of the machining areas is kept positioned therein. Therefore, when a long workpiece placed on the machining table is machined, the openings above the workpiece can be shielded.

According to still another embodiment of the third invention, the shielding members have: front and rear stick members bridged between the right and left column main bodies; and a large number of band-plate shaped curtain plates hung from and supported by the front and rear stick members, and the stick members are driven by a driving mechanism to move up/down between a closing position for substantially closing the openings and an opening position for opening the openings.

In this embodiment, a large number of the band-plate shaped curtain plates hung from and supported by the stick members are driven to move up/down between the closing position and the opening position. Therefore, only a simple structure is necessary and no special installation space is needed for disposing the shielding member. In addition, the curtain plates can be kept lifted when the machining unit is moved to the next machining area, so that the interference to the workpiece by the curtain plates can be prevented According to yet another embodiment of the third invention, the curtain plates are hung from the stick members to be vertically movable and stop at a position abutting on the workpiece when the stick members are moved down to the closing position.

In this embodiment, when the curtain plates move down to abut on the workpiece, they stop at this position. Therefore, when a long workpiece in a shape having different height positions is machined, it is possible to automatically and surely shield the openings above the workpiece.

According to yet another embodiment of the third invention, each of the curtain plates is composed of an upper plate supported by the stick member and a lower plate supported by the upper plate to be vertically movable, and when the stick members are moved down to the closing position, the lower plates stop at a position abutting on the workpiece.

In this embodiment, each of the curtain plates is composed of the upper plate supported by the stick member and the lower plate supported by the upper plate to be movable in the up/down direction. Therefore, the lower plates relatively move in an upward direction, so that with a simple structure, it is possible to automatically and surely shield the openings above a long workpiece in a shape with different height positions.

DETAILED DESCRIPTION OF THE PREFERRED EMBODIMENTS

Figure 1:
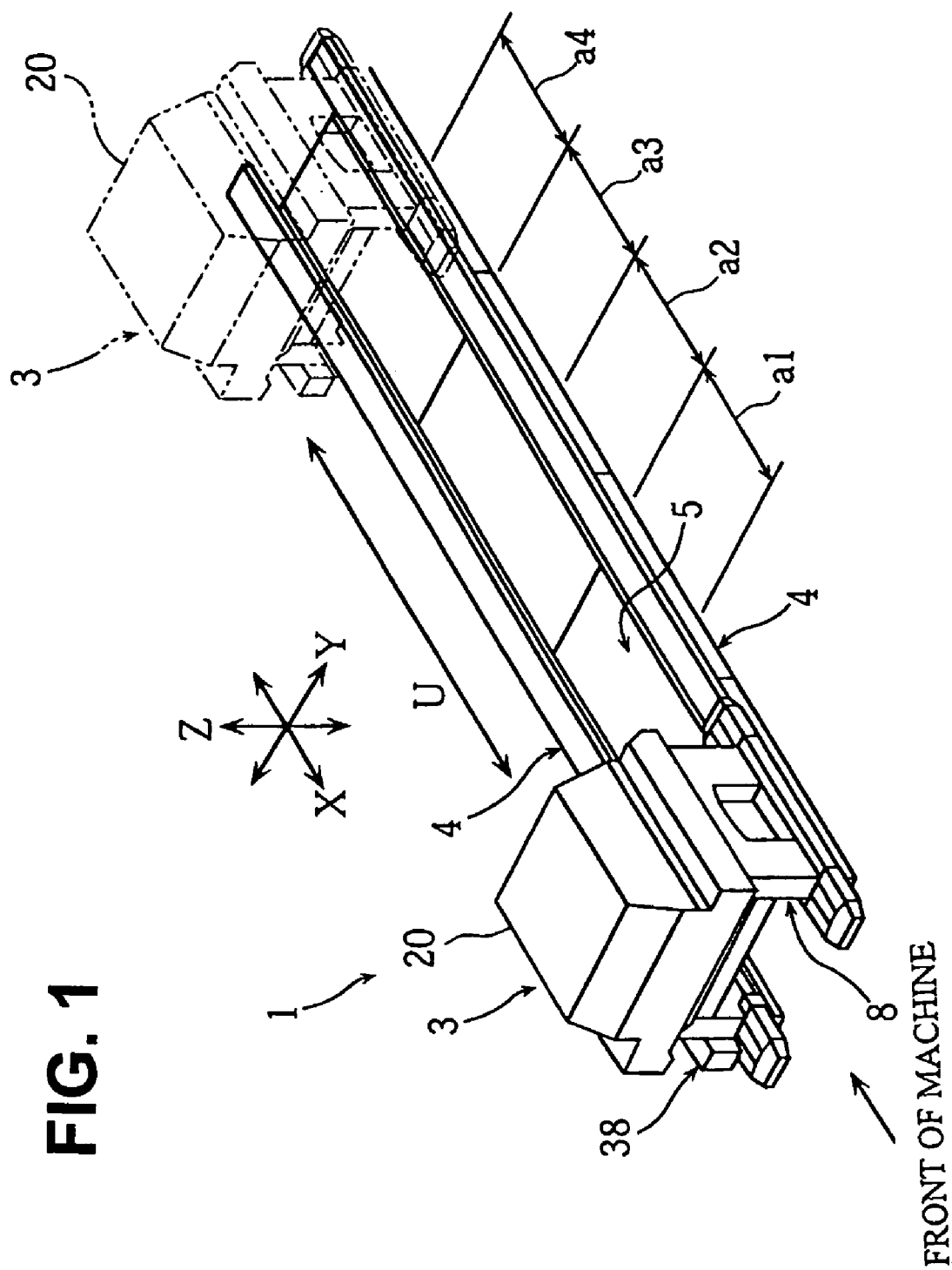
FIG. 1 is a perspective view of an entire vertical machining center according to a first embodiment of the present invention.
Figure 2:
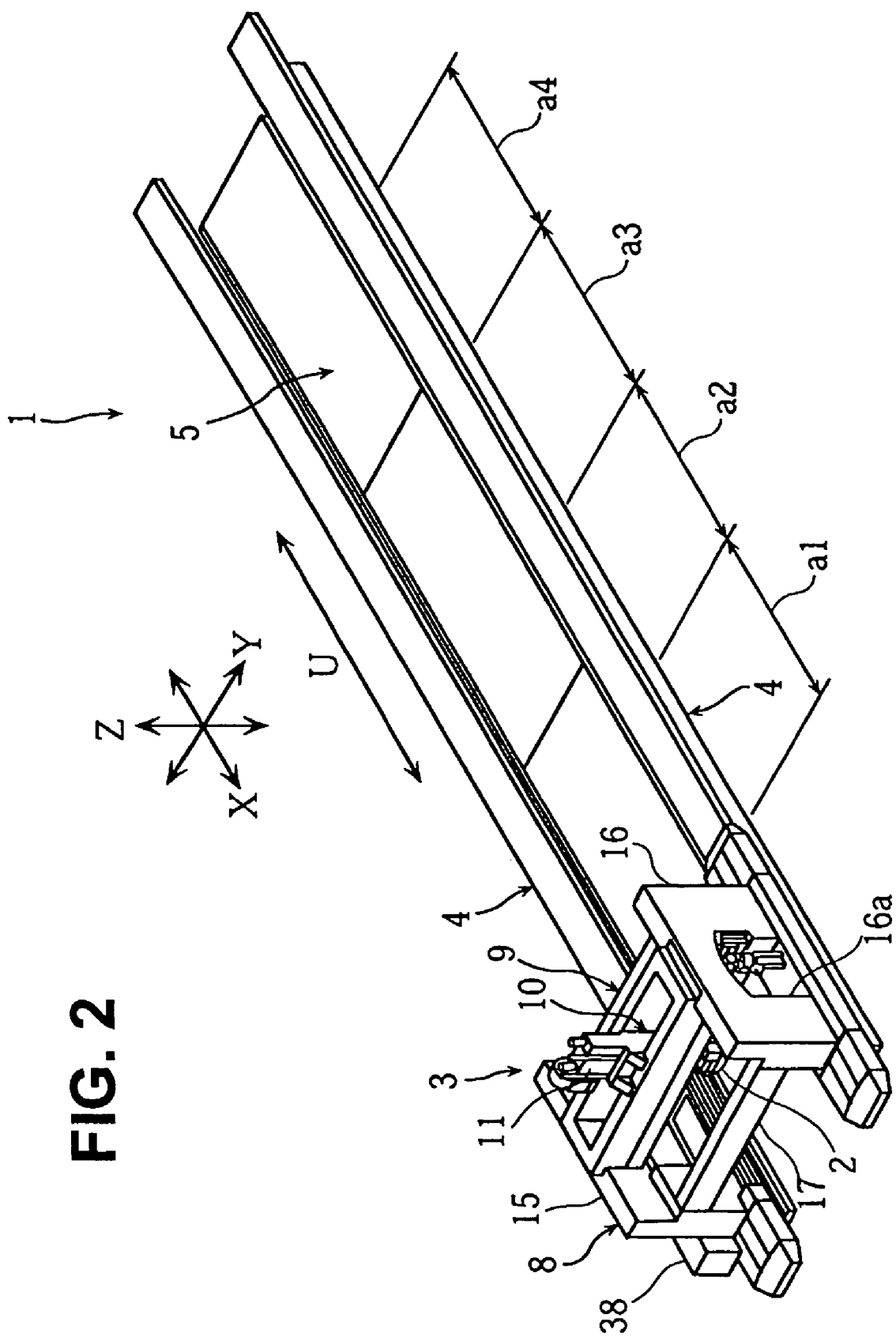
FIG. 2 is a perspective view of the vertical machining center.
Figure 3:
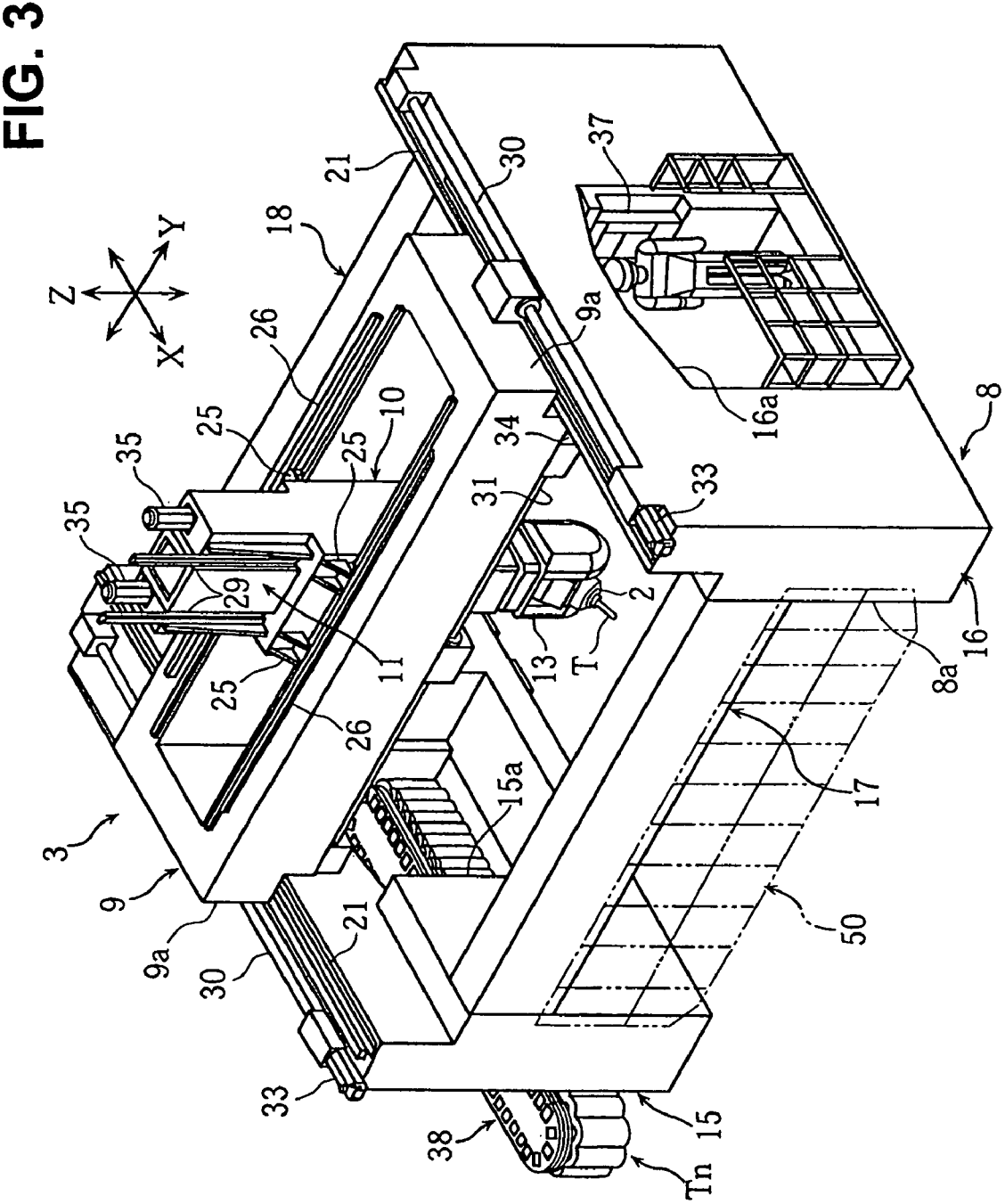
FIG. 3 is a perspective view of a machining unit of the embodiment.

Hereinafter, embodiments of the present invention will be described based on the attached drawings.

In the drawings, 1 denotes a vertical machining center, which includes: a machining unit 3 by which a spindle 2 with a tool T attached thereto is supported to be relatively movable in three axial directions, namely, X-axis, Y-axis, and Z-axis directions; and a pair of right and left beds 4, 4 by which the machining unit 3 is supported to be movable in a U-axis direction (an arrangement direction of machining areas) parallel to the X-axis direction.

A machining table 5 is disposed between the right and left beds 4, 4. This machining table 5 is a large-sized one having a length of 20 m to 30 m and a width of 3 m to 5 m, and has a plurality of machining areas a1 to a4 arranged in the U-axis direction. Further, in U-axis direction both end portions of the right and left beds 4, 4, retreat spaces for the machining unit 3 are provided so as to be positioned on U-axis direction outer sides of the machining table 5, so that a wide and long workpiece (not shown) can be moved in an up/down direction for attachment/detachment while the machining unit 3 is kept positioned in the retreat space.

The machining unit 3 includes: a gate-shaped column 8 mounted on the right and left beds 4, 4 so as to be bridged over the machining table 5, when seen in the U-axis direction from a front side of the machine; a cross rail 9 supported by the column 8 to be movable in the X-axis direction; a saddle 10 supported by the cross rail 9 to be movable in the Y-axis direction; and a ram 11 supported by the saddle 10 to be movable in the Z-axis direction, and the spindle 2 is disposed on a lower end of the ram 11 with an axis thereof being set substantially vertical.

Figure 10:
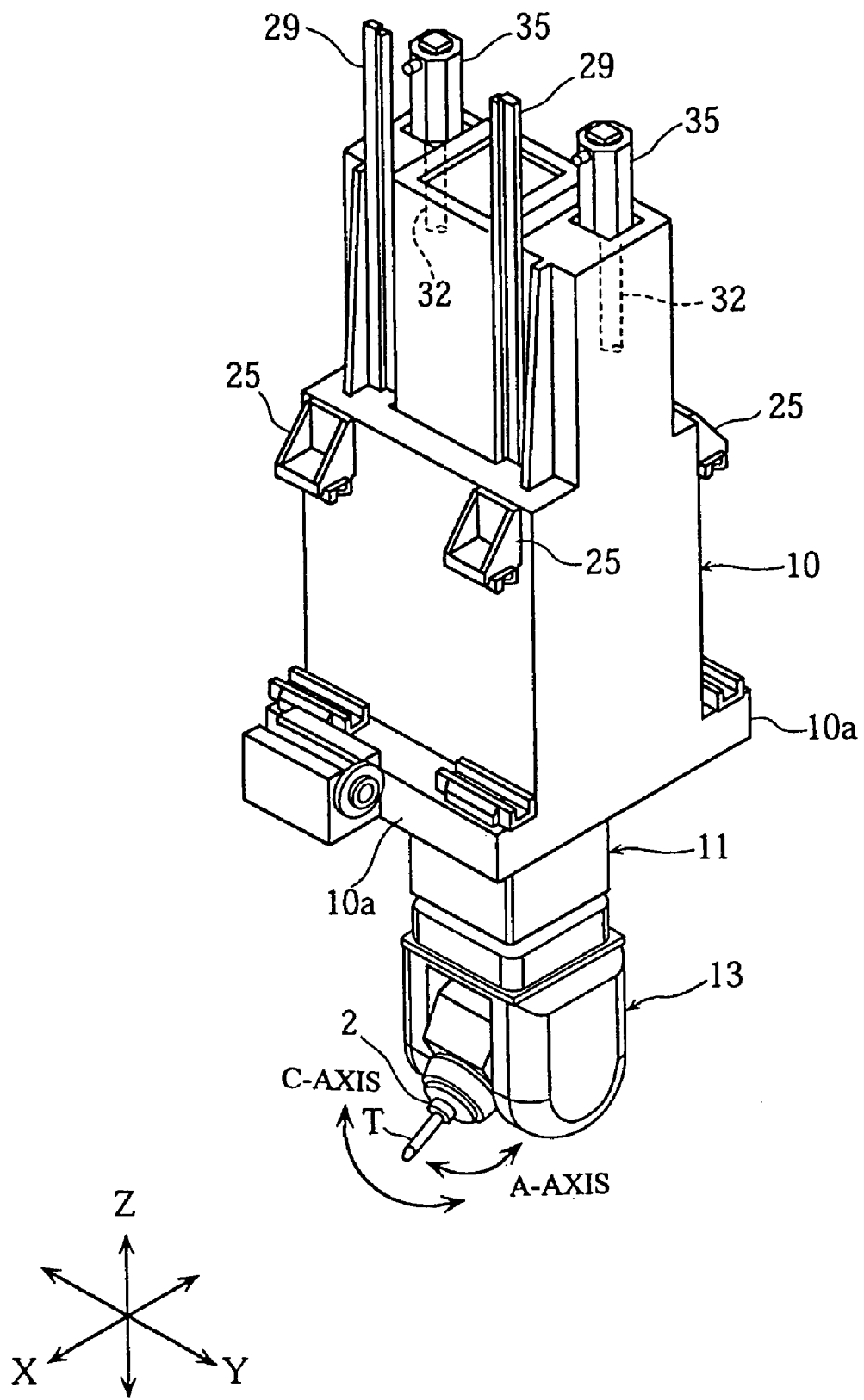
FIG. 10 is a perspective view of a ram of the machining unit.
Figure 11:
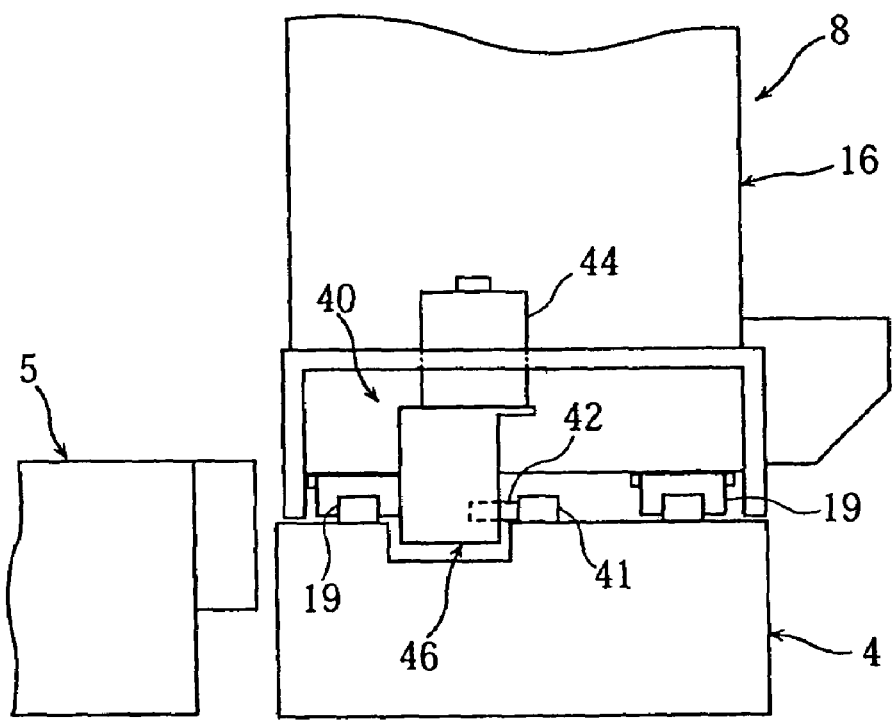
FIG. 11 is a front view of a driving device of the machining unit.
Figure 12:
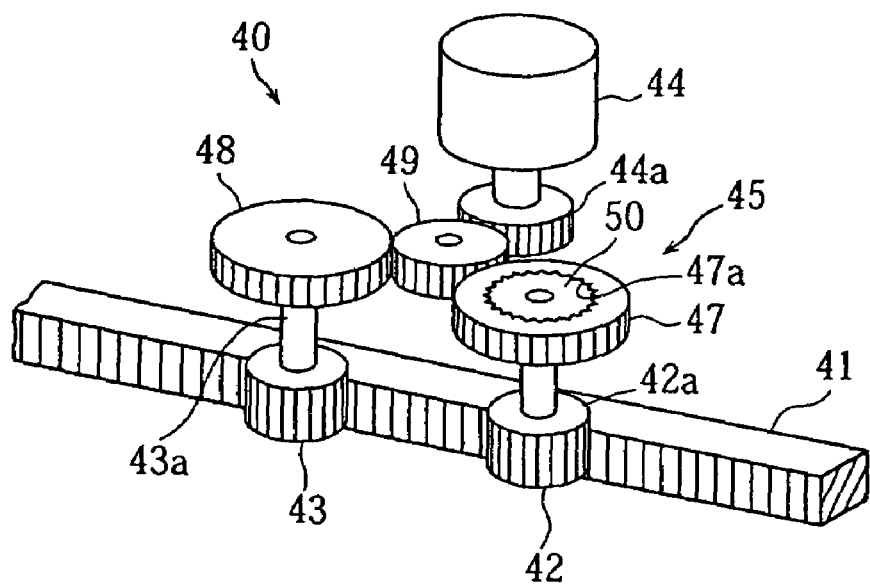
FIG. 12 is a perspective view of the driving device.
Figure 13:
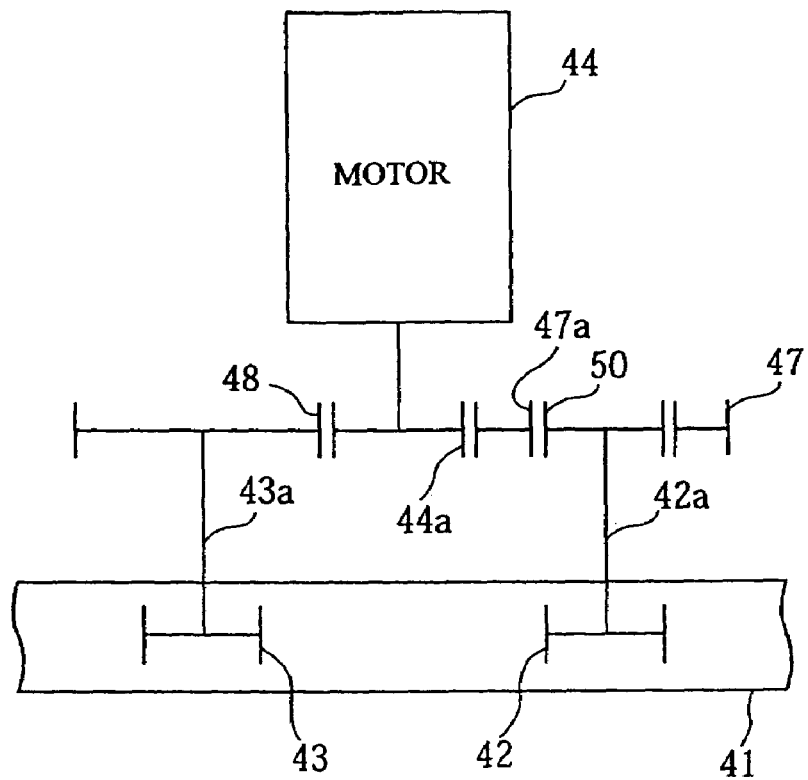
FIG. 13 is a schematic view of the driving device.
Figure 14:
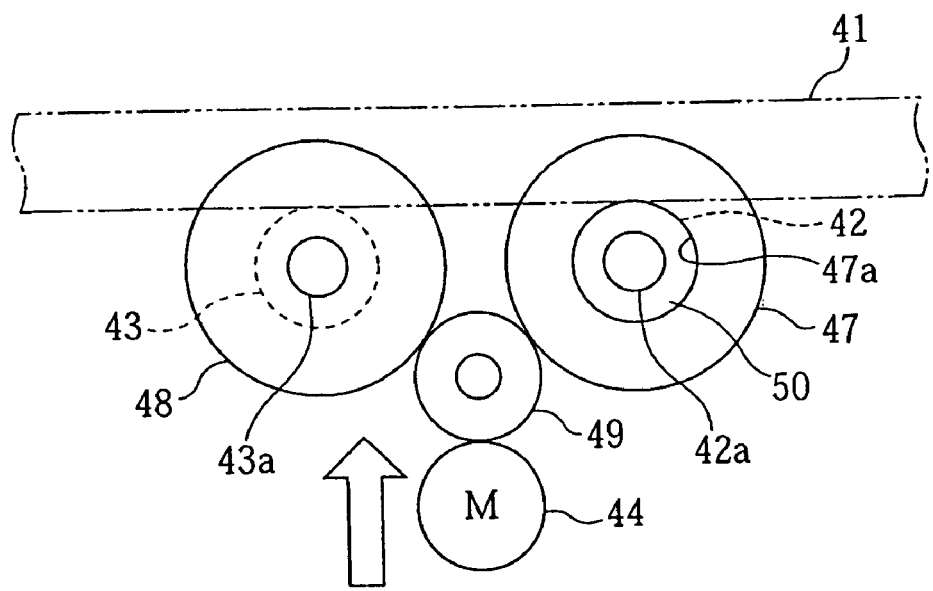
FIG. 14 is a schematic view of the driving device.

As shown in FIG. 10, the ram 11 includes a rotary index device 13 for driving the spindle 2 to be rotary indexed in an A-axis direction around a line perpendicular to the axis and in a C-axis direction around the axis, thereby enabling workpiece machining by five-axis control.

The gate-shaped column 8 is structured such that front walls and rear walls of left and right column main bodies 15, 16 with substantially rectangular shape in a side view disposed on the left and right beds 4 are integrally coupled by front and rear cross frames 17, 18. Each of the left and right column main bodies 15, 16 is supported by pair of U-axis guide rails 19, 19 disposed on an upper face of each of the beds 4, 4 to be movable in the U-axis direction. Further, a ceiling portion of the gate-shaped column 8 is covered with a cover 20.

The cross rail 9 is in a rectangular box shape having a vertical opening therein, and in a plane view, is disposed in a space surrounded by the left and right column main bodies 15, 16 and the front and rear cross frames 17, 18. Further, the cross rail 9 has flange portions 9a, 9a formed in left and right upper edge portions, and the left and right flange portions 9a are supported by X-axis guide rails 21, 21 provided on upper faces of the column main bodies 15, 16 to be movable in the X-axis direction.

The saddle 10 is in a square cylindrical shape having a vertical opening, and is disposed in the cross rail 9. On each of front and rear walls of the saddle 10, a pair of triangular brackets 25, 25 are fixedly attached, and the front and rear brackets 25, 25 are supported by Y-axis guide rails 26, 26 provided on front and rear upper faces of the cross rail 9 to be movable in the Y-axis direction.

Further, in lower edges of the front and rear walls of the saddle 10, flange portions 10a, 10a are formed, and the front and rear flange portions 10a are supported by Y-axis guide rails 27, 27 provided on front and rear lower faces of the cross rail 9 to be movable in the Y-axis direction. The saddle 10 is thus sandwiched by the upper and lower Y-axis guide rails 26, 27.

The ram 11 is in a square cylindrical shape extending vertically, and is disposed in the saddle 10. Four faces, namely, front, rear, right, and left walls of the ram 11 are supported via slippery faces (not shown) provided on inner wall faces of the saddle 10 to be movable in the Z-axis direction. Note that 29 denotes a scale detecting a Z-axis direction position of the ram 11.

X-axis and Y-axis strokes are set to about 3 m to about 4 m, and a Z-axis stroke is set to about 1 m to about 2 m. Further, the cross rail 9, the saddle 10, and the ram 11 are driven to reciprocate by ball screws 30, 31, 32 and servo motors 33, 34, 35, respectively.

The right column main body 16 has an opening 16a for work space large enough for an operator to get in/out therethrough, and a not-shown door separating the inside and outside of the machine is provided in the opening 16a. Further, an operation panel 37 is disposed on an outer side of the door inside the opening 16a for work space.

A tool magazine 38 holding a large number of tools Tn is disposed on an outer wall of the left column main body 15. Further, the column main body 15 has a tool change window 15a provided in a portion facing a tool change position, and through this tool change window 15a, a not-shown tool change arm automatically changes a tool T attached to the spindle 2 and having finished machining to a subsequent process tool held by the tool magazine 38.

The machining unit 3 is driven to reciprocate in the U-axis direction by a U-axis driving device 40 shown in FIG. 11 to FIG. 14, and the driving device 40 is structured as follows.

A rack 41 extending along substantially the whole length of the bed 4 is disposed on the bed 4, and a pair of front and rear pinions 42, 43 engaged with the rack 41 is disposed in the column 8. The front and rear pinions 42, 43 are rotary driven by one motor 44 via a reduction gear group 45. The reduction gear group 45 is housed in a gear box 46 fixed to the column 8, and the motor 44 is attached to the gear box 46.

The reduction gear group 45 is structured such that reduction large gears 47, 48 are fixed to pinion shafts 42a, 43a of the front and rear pinions 42, 43 and a rotary gear 44a of the motor 44 is engaged with the reduction large gears 47, 48 via a middle gear 49. Further, inner peripheral teeth 47a are formed in the reduction large gear 47, and outer peripheral teeth 50 fixed to the pinion shaft 42a of the front pinion 42 are engaged with the inner peripheral teeth 47a. The outer peripheral teeth 50 and the inner peripheral teeth 47a are engaged with each other, being deviated so that backlash is made smaller.

Figure 4:
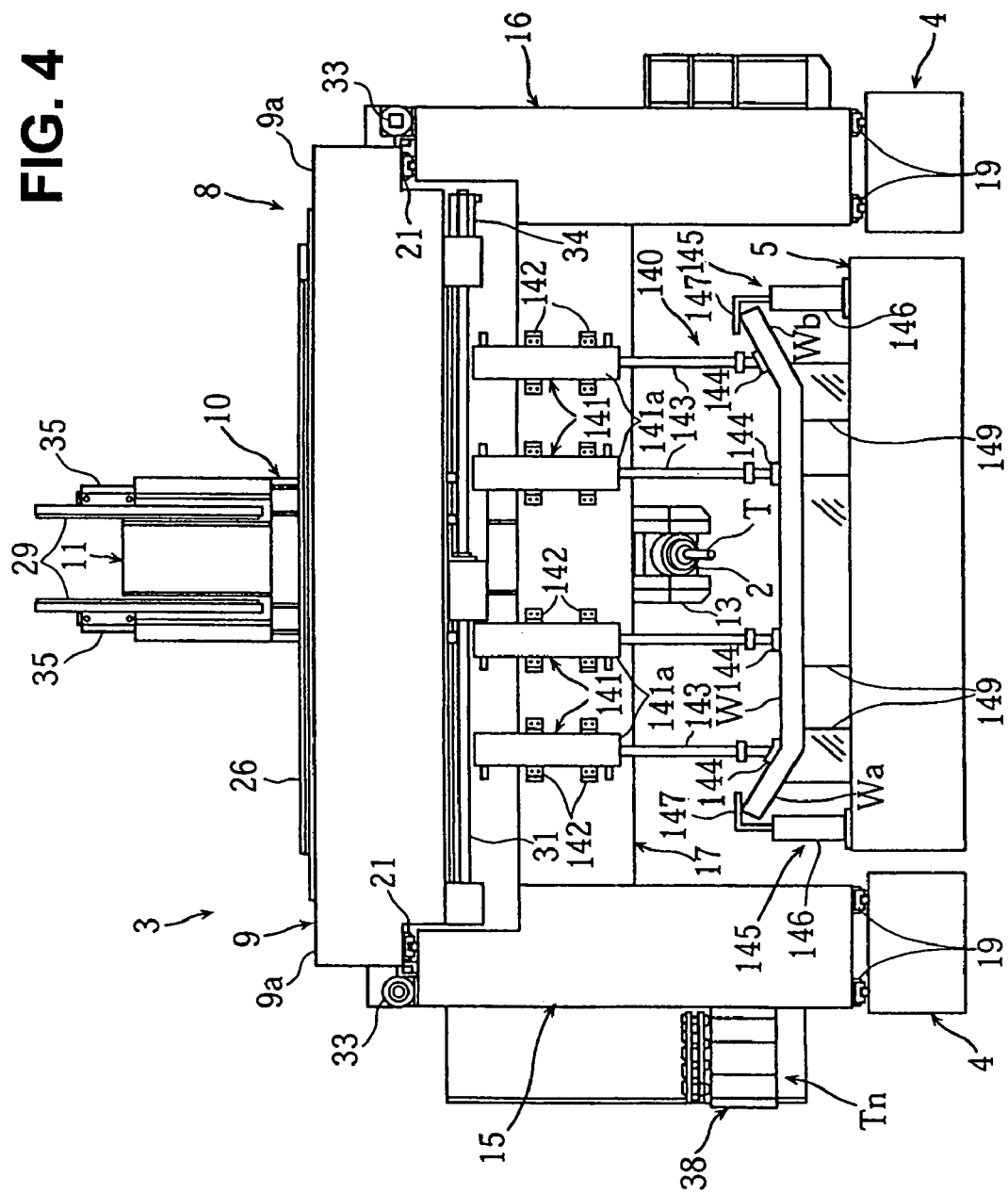
FIG. 4 is a front view of the machining unit.

As shown in FIG. 4, clamping devices 145 are disposed on right and left end portions of the machining table 5, being predetermined interval apart from each other in a longitudinal direction. Each of the clamping devices 145 is roughly structured such that a clamping rod 147 is supported by a hydraulic cylinder 146 to be reciprocatable. The clamping rods 147 are moved down while catching left and right outer peripheral portions Wa, Wb of a wide and long workpiece W, thereby fixedly positioning the wide and long workpiece W on the machining table 5. Further, jigs 149 supporting a lower face of the wide and long workpiece W are disposed on the machining table 5.

As shown in FIG. 4 to FIG. 9, a workpiece presser 140 pressing and fixing the wide and long workpiece W to the machining table 5 is disposed in the machining unit 3, and the workpiece presser 140 is structured as follows.

Four cylinder mechanisms 141 are disposed at predetermined intervals on each of front and rear wall faces of the front and rear cross frames (beam members) 17, 18, which are bridged over the machining table 5, of the column 8, and the cylinder mechanisms 141 are disposed at positions facing widthwise both end portions and center portions in U-axis direction front and rear ends of a machining area portion of the wide and long workpiece W.

Each of the cylinder mechanisms 141 has a cylinder 141a fixedly bolted to the cross frame 17 or 18 with a pair of upper and lower brackets 142, 142. Each of the cylinder mechanisms 141 is structured such that a piston rod 143 is connected to a piston (not shown) slidably inserted in the cylinder 141a, and each of the piston rods 143 is driven to move up/down when compressed air is supplied to each of the cylinders 141a.

A thrust pad (pad member) 144 is attached to a lower end portion of each of the piston rods 143. The thrust pad 144 changes its mounting posture and shape so as to follow a slanted face or irregularities of the workpiece W.

Pressure of the compressed air supplied to each of the cylinder mechanisms 141 is controlled to a value being large enough to fully fix the wide and long workpiece W but not causing the deformation of the workpiece W. Incidentally, the cylinder mechanisms 141 may be controlled individually or in a unit of a group according to the size or the like of the wide and long workpiece W.

In front and rear openings 8a, 8b formed by the left and right column main bodies 15, 16, the front and rear cross frames 17, 18, and the machining table 5, shielding mechanisms 100 preventing chips and coolant from scattering out of the machine during machining are disposed, and the shielding mechanisms 100 are structured as follows.

As shown in FIG. 4 to FIG. 8, each of the shielding mechanisms 100 is structured such that a large number of band-plate shaped curtain plates 56 are hung from and supported by a stick member 55 extending between the left and right column main bodies 15, 16, and piston rods 58 of right and left cylinder mechanisms (driving mechanisms) 57 are coupled to both end portions of the stick member 55. The cylinder mechanisms 57 are fixedly attached to each of front and rear outer wall faces of the left and right column main bodies 15, 16.

Each of the cylinder mechanisms 57 is structured such that a not-shown piston is slidably inserted in a cylinder 59 and the piston rod 58 is connected to the piston, and the front and rear cylinder mechanisms 57 drive the curtain plates 56 via the stick members 55 to move up/down between a closing position and an opening position for substantially closing and opening the front and rear openings 8a, 8b respectively.

Figure 5:
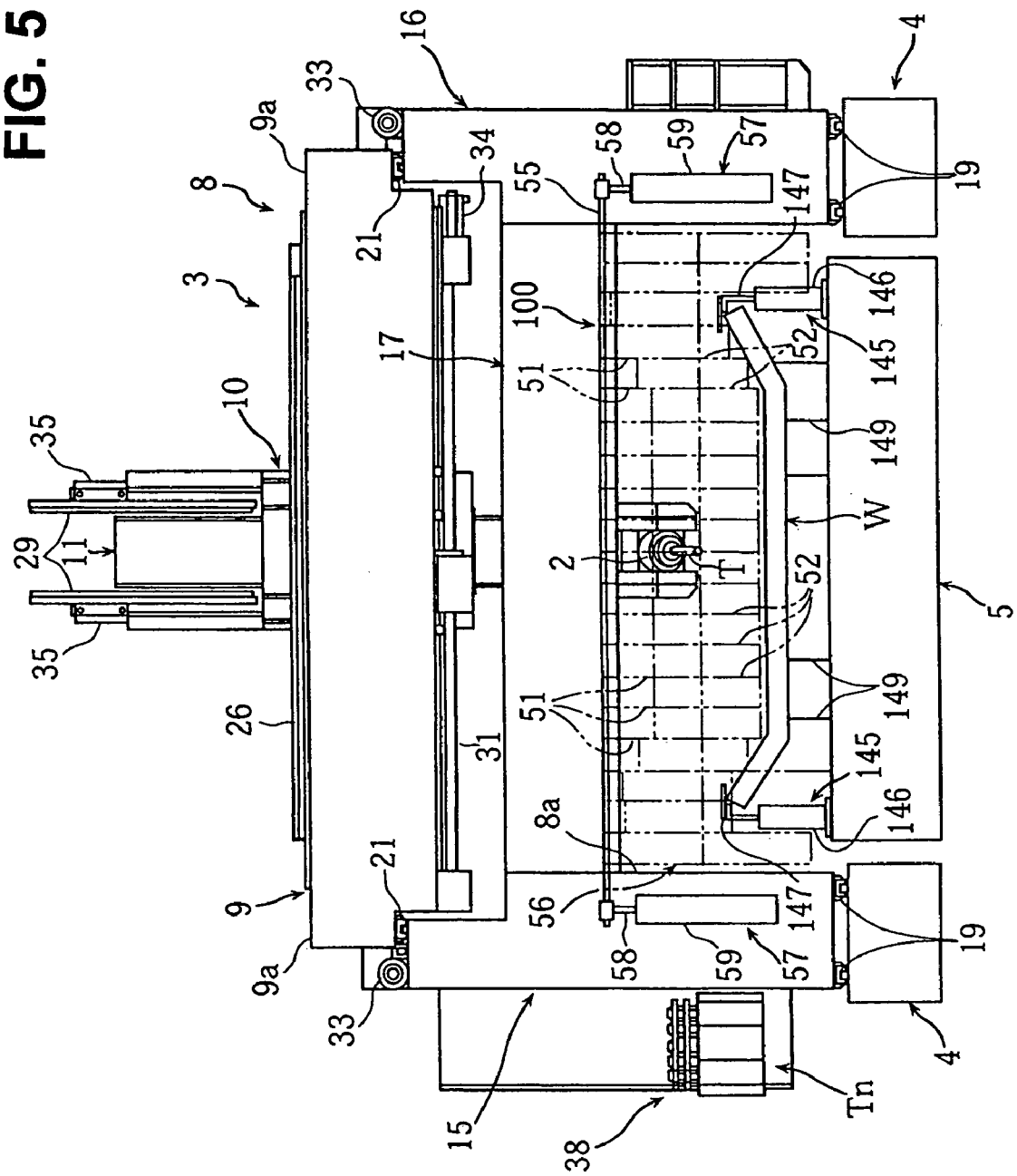
FIG. 5 is a front view of the machining unit.
Figure 6:
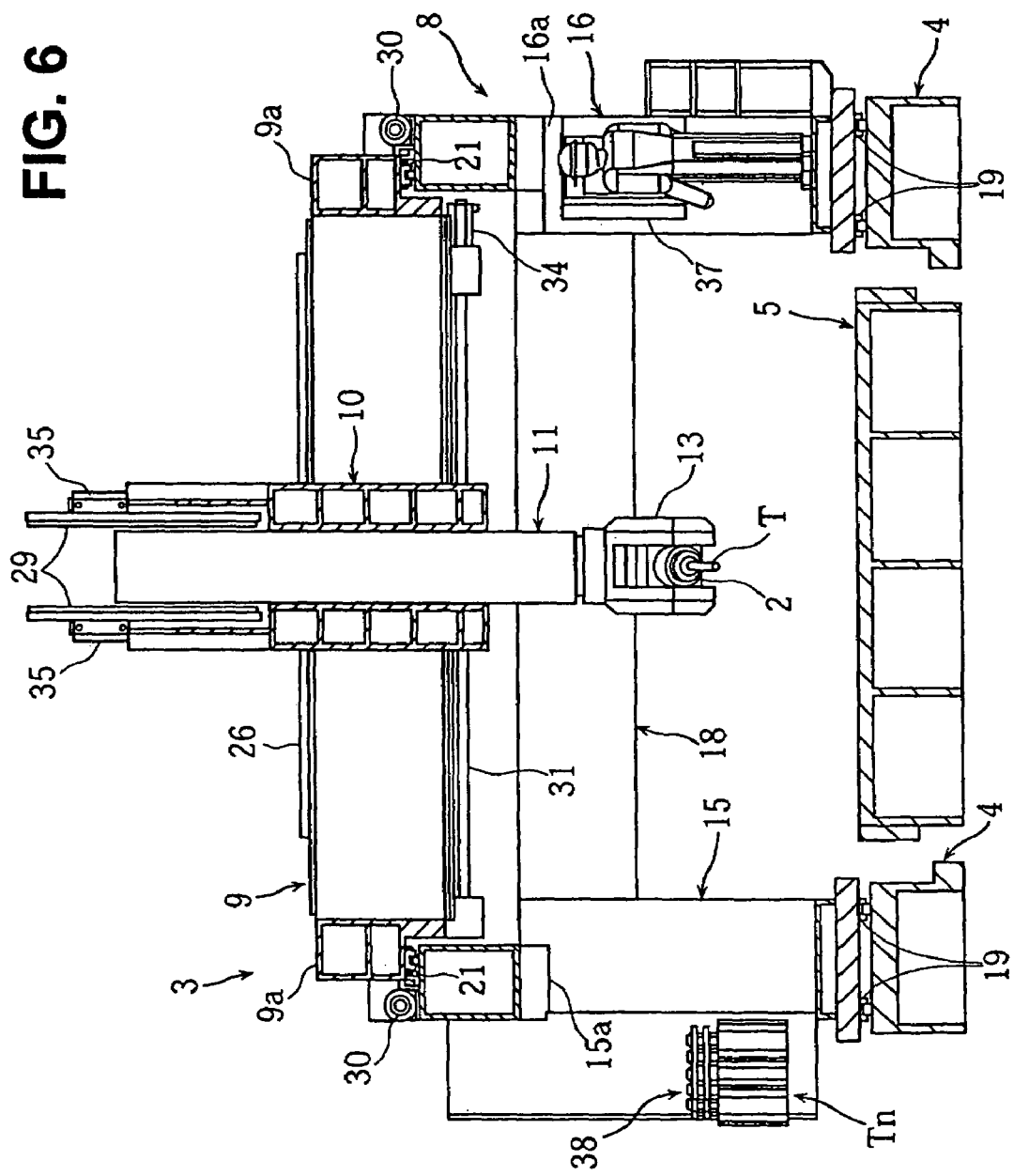
FIG. 6 is a front cross-sectional view of the machining unit.
Figure 7:
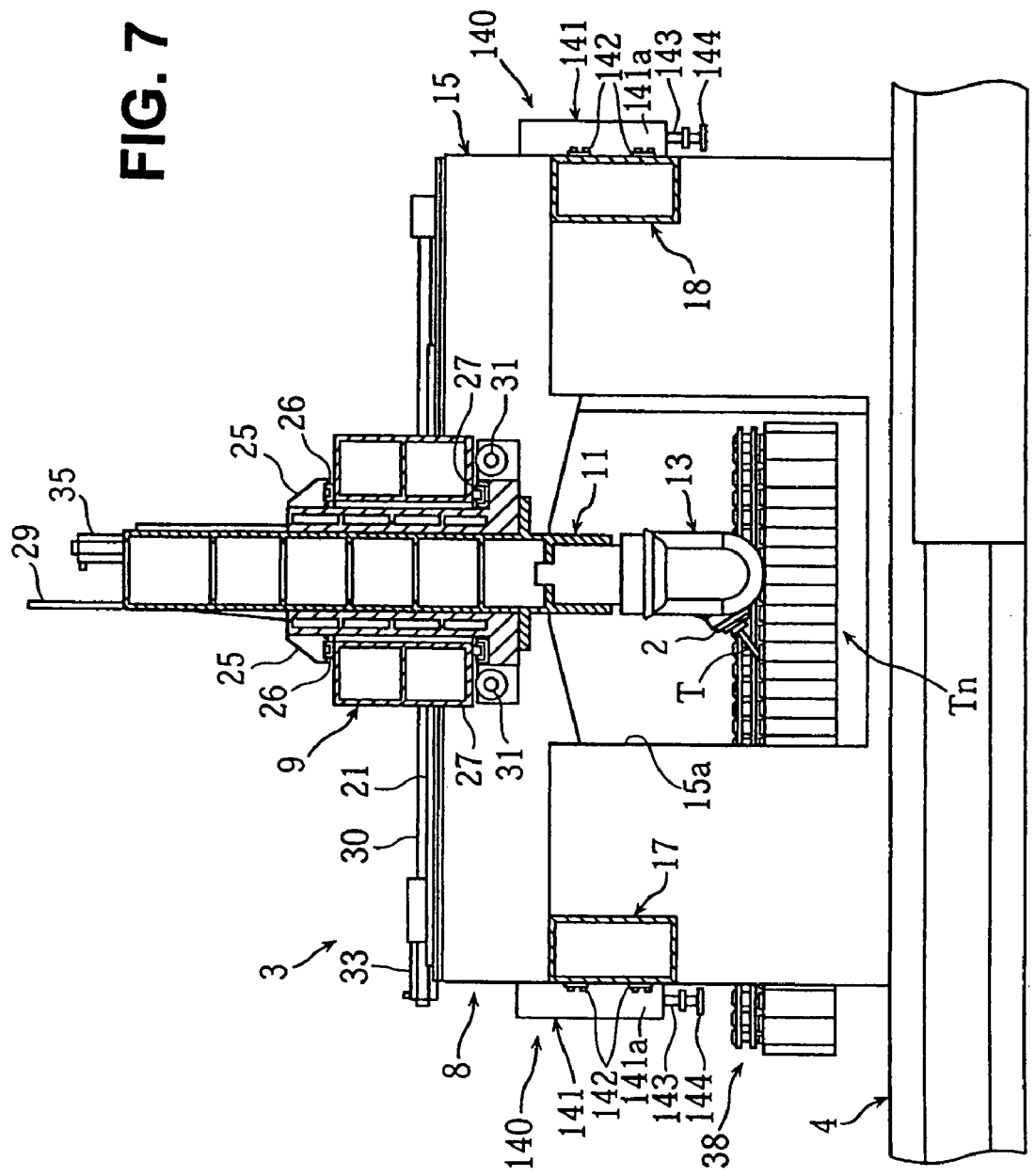
FIG. 7 is a side cross-sectional view of the machining unit.
Figure 8:
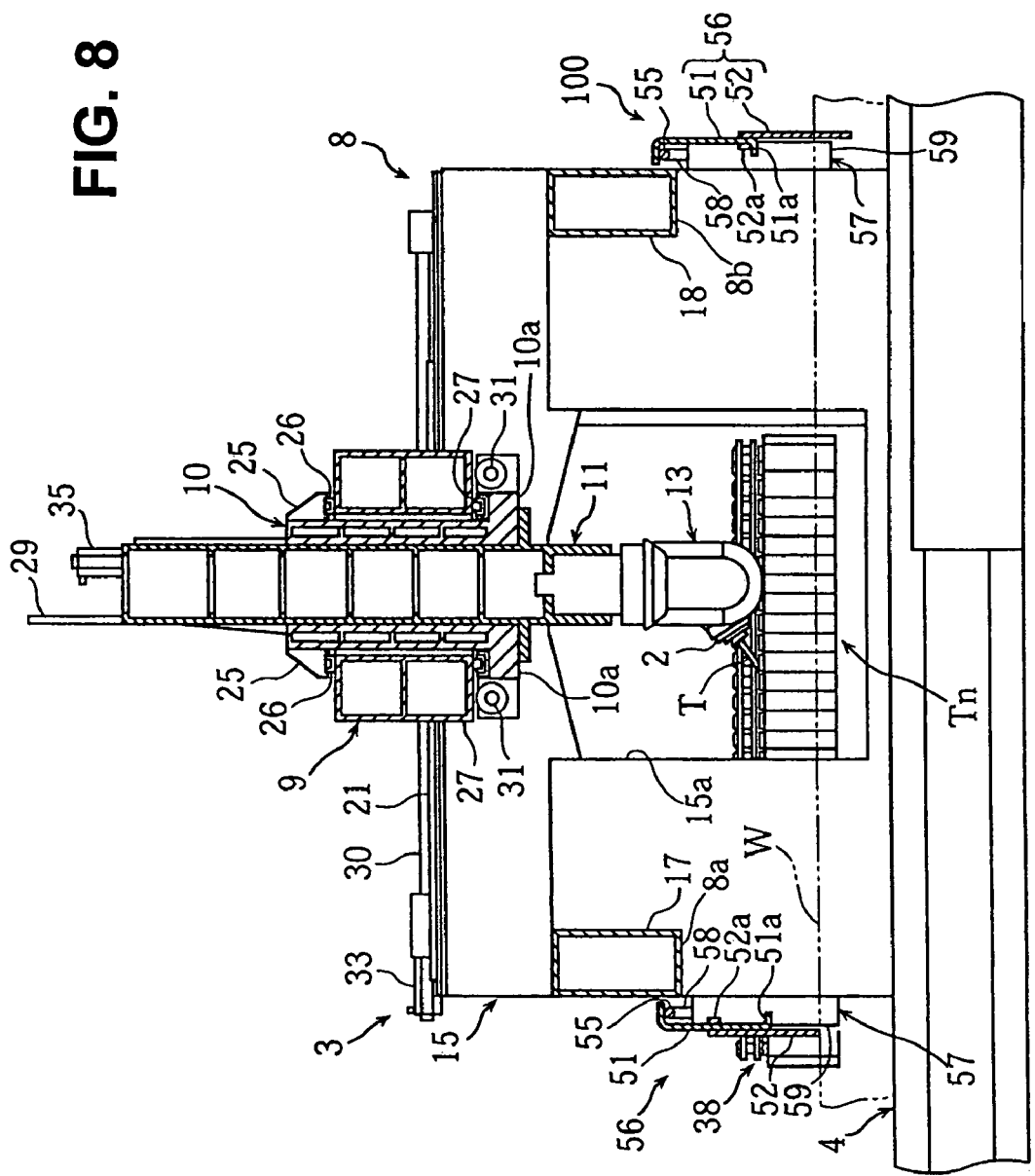
FIG. 8 is a side cross-sectional view of the machining unit.
Figure 9:
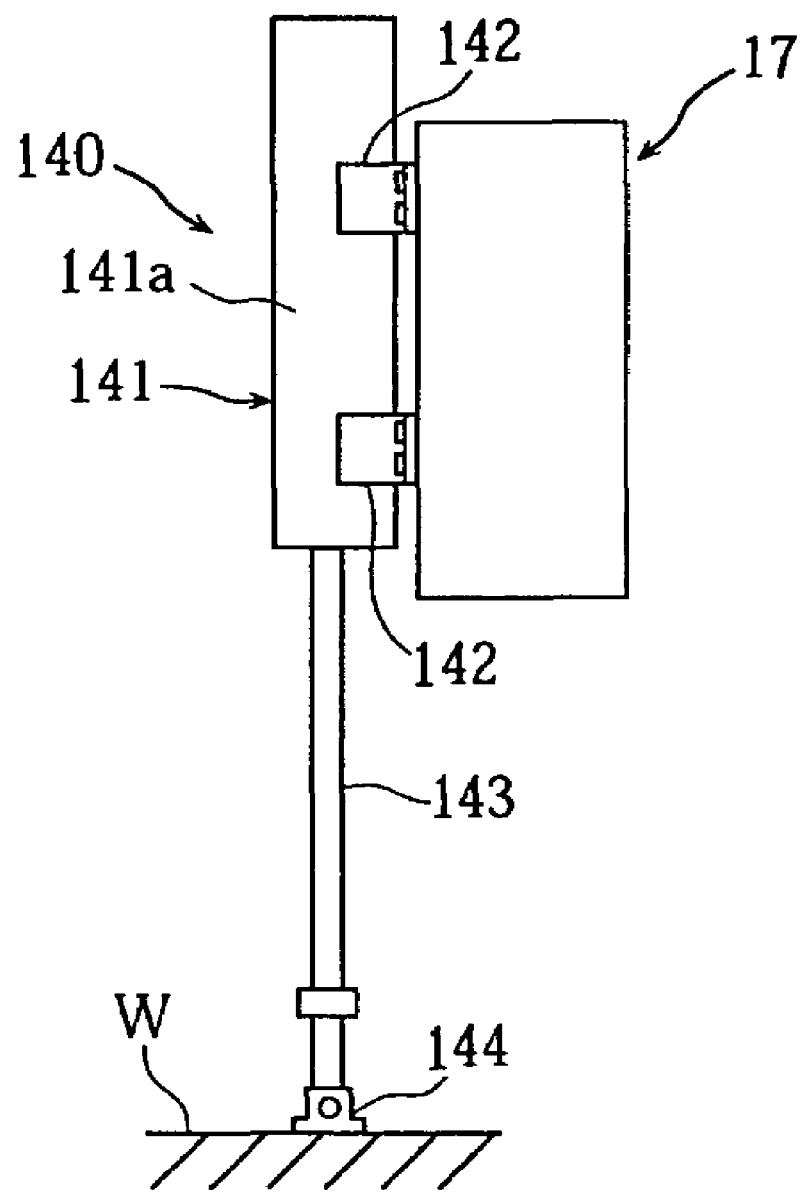
FIG. 9 is a side view of a workpiece presser of the machining unit.

As shown in FIG. 5, the curtain plates 56 have upper plates 51 covering upper half portions of the openings 8a, 8b and lower plates 52 covering lower half portions thereof, and upper end portions of the upper plates 51 are fixedly attached to the stick members 55.

Each of the upper plates 51 has a bent stopper portion 51a formed in a lower end portion. Further, each of the lower plates 52 has a ring-shaped catch portion 52a in an upper end portion. The upper plate 51 is inserted in the catch portion 52a, and the catch portion 52a regulates a lower end position of the lower plate 52 by abutting on the stopper portion 51a. Whereby, the lower plates 52 are supported by the upper plates 51 to be vertically movable. When the curtain plates 56 move down to the closing position and the lower plates 52 abut on the workpiece W, the lower plates 52 stop at this position, thereby absorbing difference in height position among widthwise portions of the wide and long workpiece W.

For workpiece machining by the vertical machining center 1 of this embodiment, the wide and long workpiece W is placed on and supported by the jigs 149 of the machining table 5 and is fixedly positioned by the clamping devices 145. Next, the machining unit 3 placed in the retreat space is moved to the first machining area a1 to be fixedly positioned.

Then, the compressed air is supplied to the cylinder mechanisms 141 to move down the piston rods 143, so that the wide and long workpiece W is pressed and fixed onto the machining table 5. In this case, the thrust pads 144 change their mounting posture so as to follow a slanted face of the wide and long workpiece W and slanted, or further press the workpiece W while being deformed. Consequently, an outer periphery of a first machining area a1 portion of the wide and long workpiece W is pressed and fixed by the right and left clamping devices 145 and the front and rear cylinder mechanisms 141.

Subsequently, the front and rear curtain plates 56 are moved down. As a result, the lower plates 52 abut on an upper face of the wide and long workpiece W sequentially in a width direction, and when they further move down to the closing position, the lower plates 52 stop at a workpiece abutting position to move relatively upward, so that the difference in height position among respective portions of the workpiece W is absorbed and thus the openings 8a, 8b above the workpiece W are shielded. Note that the other lower plates 52 positioned on a widthwise outer side of the workpiece W move down to a lower end position close to a surface of the machining table 5.

In this state, the tool T applies predetermined machining to the wide and long workpiece W while the spindle 2 is relatively moved in the X-axis, Y-axis, and Z-axis directions. In this case, since the front and rear openings 8a, 8b of the column 8 are covered with the upper and lower plates 51, 52, chips and coolant do not scatter out of the machine during the machining.

When the workpiece machining is finished, the piston rods 143 are moved up to release the pressing of the wide and long workpiece W, and the machining unit 3 is moved to the next machining area a2. In the machining area a2, similarly to the above, the machining unit 3 is fixedly positioned and the cylinder mechanisms 141 fix and press the wide and long workpiece W. Further, similarly to the above, in the machining area a2, the openings 8a, 8b are covered with the curtain plates 56, and then the spindle 2 performs workpiece machining. In this manner, the machining unit 3 is moved to the machining areas a1 to a4 sequentially, so that the spindle 2 performs workpiece machining in each of the machining areas a1 to a4. Concretely, this machining is suitable for forming windows at predetermined intervals by boring in a large vehicle body, for example, a train or a bus or for forming bolt holes and the like in outer peripheral portions of window holes.

According to this embodiment, the spindle 2 is supported by the machining unit 3 to be relatively movable in the X-axis, Y-axis, and Z-axis directions, and the machining unit 3 is supported by the right and left beds 4, 4 to be movable in the U-axis direction parallel to the X-axis. Therefore, for the shift to/from the machining areas a1 to a4 of the machining table 5, the whole machining unit 3 is moved, and when the workpiece machining is performed in each of the machining areas a1 to a4, the spindle 2 supported by the machining unit 3 is relatively moved in the X-axis, Y-axis, and Z-axis directions or the A-axis and C-axis directions. Owing to this structure, the weight of the spindle 2 when moving on the machining unit 3 in the X-axis, Y-axis, and Z-axis directions can be reduced, enabling high-speed movement of the spindle 2 compared with a conventional case where the whole column is moved for workpiece machining, which accordingly can reduce the machining time.

In this embodiment, the machining unit 3 is disposed to be bridged over the machining table 5 disposed between the right and left beds 4, 4, so that the spindle 2 can be supported, being set vertical, which makes the present invention applicable to a vertical machining center.

Further, the machining unit 3 is structured such that the cross rail 9 in the rectangular box shape is disposed in the inner space of the gate-shaped column 8 in which the left and right column main bodies 15, 16 are coupled by the front and rear cross frames 17, 18, the saddle 10 in the square cylindrical shape is disposed in the cross rail 9, and the ram 11 with the spindle 2 attached thereto is disposed in the saddle 10. This structure can realize higher rigidity for supporting the spindle 2. Moreover, since the spindle 2 can be supported in the vicinity of the gravity center of the machining unit 3, it is possible to enhance machining accuracy while realizing higher speed of the spindle 2, and moreover, it is possible to set a machining stroke of the spindle 2 large. Specifically, in a conventional gantry-type machine tool, since a saddle and a ram are movably supported by a front face of a column, there is a danger that a spindle may fall forward when being driven to reciprocate in the Z-axis direction, which has posed a limit to an increase in movement speed and in the Z-axis stroke of the spindle.

Further, according to this embodiment, the workpiece presser 140 pressing and fixing the machining area portion of the wide and long workpiece W to the machining table 5 is provided in the machining unit 3 by which the spindle 2 is supported to be movable in the X-axis, Y-axis, and Z-axis directions. This structure ensures machining accuracy when a center portion, which is difficult to be fixed, of the wide and long workpiece W is machined.

In this embodiment, the thrust pads 144 which change their mounting posture so as to follow the workpiece shape are attached to the piston rods 143 of the cylinder mechanisms 141. This structure ensures that the wide and long workpiece W is pressed and fixed to the machining table 5 even the workpiece W has a slanted face or irregularities.

Further, the machining unit 3 is moved to each of the machining areas a1 to a4 of the machining table 5 so that the spindle 2 machines a workpiece in each of the machining areas a1 to a4. Therefore, it is only necessary to press and fix the machining area a1 to a4 portion of the workpiece, so that the workpiece presser 140 can be downsized compared with a case where the whole long workpiece is pressed, and the structure can be simplified.

In addition, the shielding mechanisms 100 each including a large number of the curtain plates 56 are disposed in the front and rear openings 8a, 8b formed by the front and rear cross frames 17, 18, the left and right column main bodies 15, 16, and the machining table 5. Since the left and right sides of a machining area by the spindle 2 are shielded by the column main bodies 15, 16, it is only necessary to shield the front and rear openings 8a, 8b formed by the left and right column main bodies 15, 16 and the front and rear cross frames 17, 18. Therefore, it is possible to downsize the shielding mechanisms 100 compared with a conventional case where the whole outer periphery of the machine main body is shielded, which can suppress cost increase.

In this embodiment, the column 8 is movable to each of the machining areas a1 to a4 of the machining table 5, and the curtain plates 56 are driven to move up/down between the closing position for substantially closing the front and rear openings 8a, 8b by abutting on the wide and long workpiece W and the opening position for opening the openings 8a, 8b. This structure makes it possible to surely shield the openings 8a, 8b above the long and wide workpiece W placed on the machining table 5 when the workpiece W is machined.

In this embodiment, a large number of the band-plate shaped curtain plates 56 hung from and supported by the stick members 55 are driven to move up/down by the cylinder mechanisms 57. Therefore, with a simple structure and without any need for providing a special installation place, the shielding mechanisms 100 can be disposed, and the curtain plates 56 can be prevented from interfering with the workpiece W when the column 8 is moved.

Each of the curtain plates 56 is composed of the upper plate 51 supported by the stick member 55 and the lower plate 52 supported by the upper plate 51 to be vertically movable. Therefore, when the wide and long workpiece W having difference in height position among respective widthwise portions is machined, the openings 8a, 8b above the workpiece W can be automatically and surely shielded with a simple structure.

Figure 15:
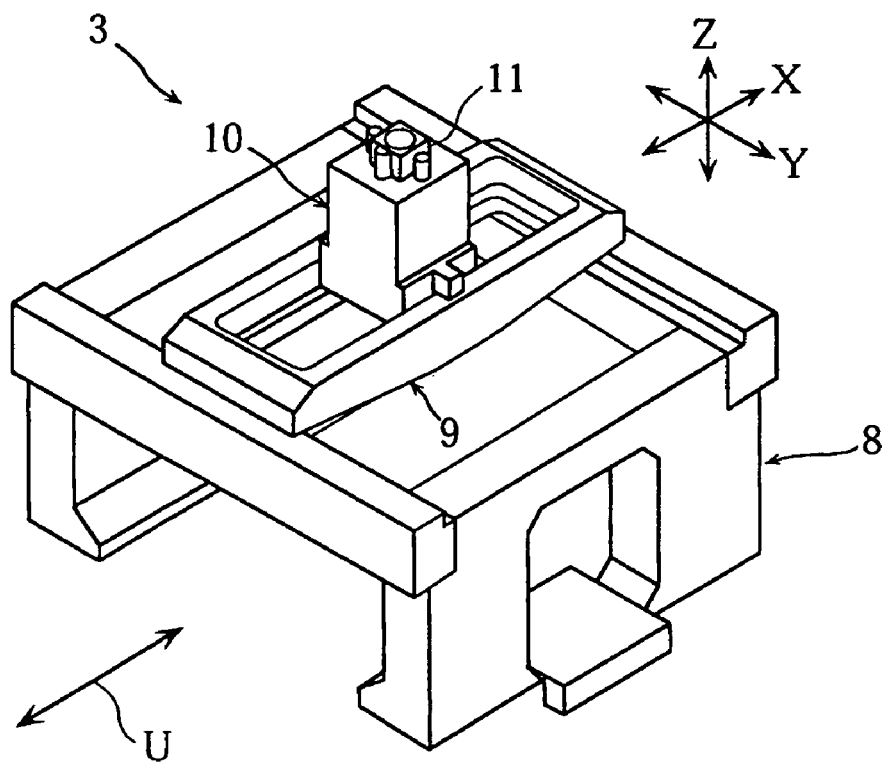
FIG. 15 is a perspective view showing a modification example of the machining unit of the embodiment.

Incidentally, the above-described embodiment has described the case where the cross rail 9 is supported by the column 8 to be movable in the X-axis direction and the saddle 10 is supported by the cross rail 9 to be movable in the Y-axis direction, but the present invention may be structured as shown in FIG. 15 such that the cross rail 9 is supported by the column 8 to be movable in the Y-axis direction and the saddle 10 is supported by the cross rail 9 to be movable in the X-axis direction. The same effects as those of the above-described embodiment can also be obtained in this case.

Further, the above-described embodiment has described the case, as an example, where the wide and long workpiece is machined, but the present invention is also applicable to a case where separate workpieces are placed on the respective machining areas of the machining table and the workpieces are sequentially machined.

Further, the above-described embodiment has described the case where the column is moved to each of the machining areas, but in the present invention, in addition to the workpiece machining by the spindle, machining in the U-axis direction by moving the column is also possible.

In this embodiment, the machining table 5 is disposed between the right and left beds 4, 4, but it is also possible to dispose the machining table on an upper face of one bed extending over the entire bottom face of the machine.

Figure 16:
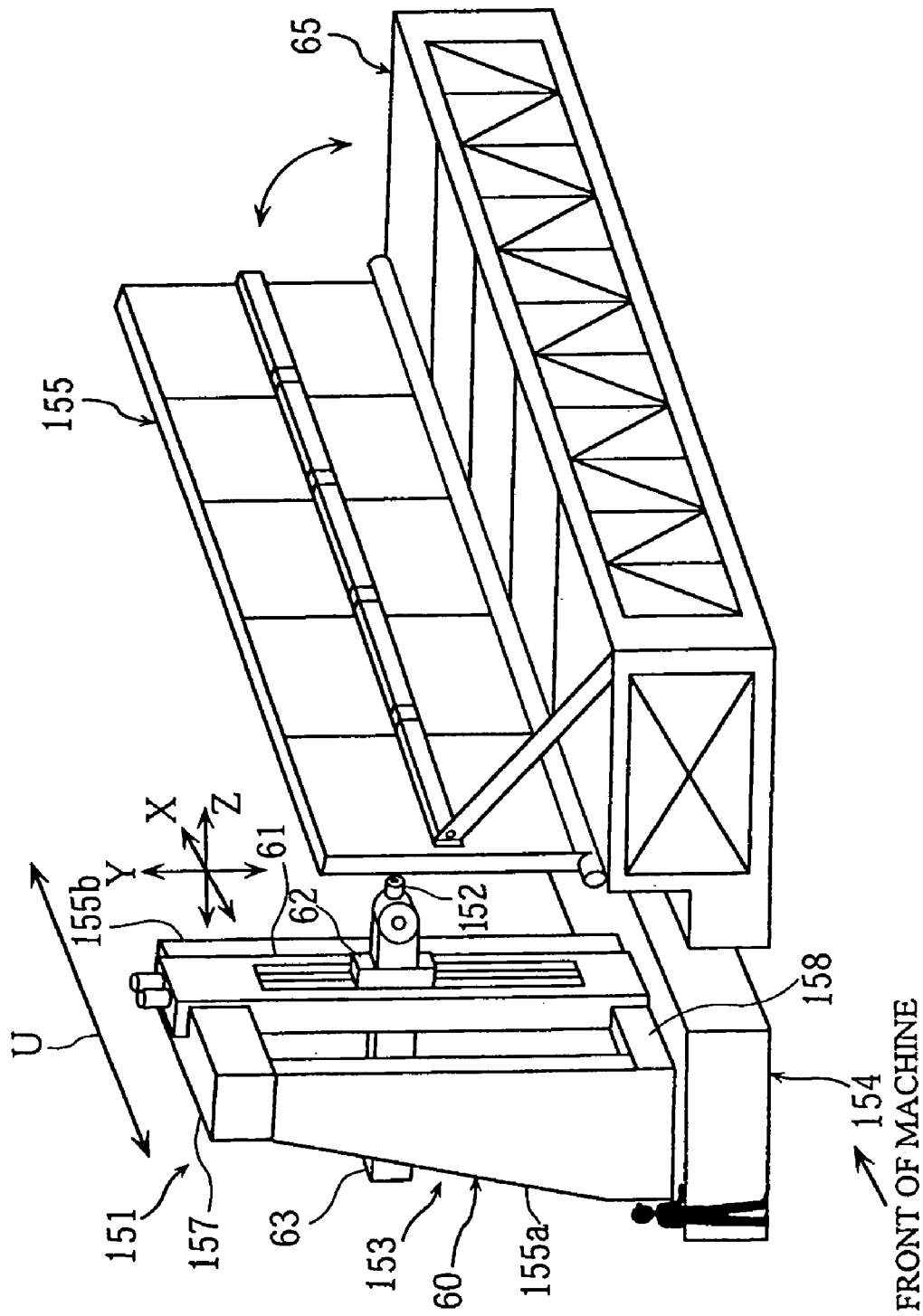
FIG. 16 is a rough perspective view of a horizontal machining center according to a second embodiment of the present invention.

FIG. 16 is a perspective view to describe a horizontal machining center according to a second embodiment of the present invention.

A horizontal machining center 151 of this embodiment includes: a machining unit 153 by which a spindle 152 with a tool T attached thereto is supported to be relatively movable in X-axis, Y-axis, and Z-axis directions; a bed 154 by which the machining unit 153 is supported to be movable in a U-axis direction (an arrangement direction of machining areas) parallel to the X-axis direction; and a machining table 155 disposed on a side of the bed 154 to be parallel thereto. Incidentally, the machining table 155 can be disposed on a wide bed.

The machining unit 153 includes: a rectangular column 60 in which, when seen in the U-axis direction from a front side of the machine, front and rear column main bodies 155a, 155b disposed on the bed 154 are integrally coupled by upper and lower cross frames 157, 158; a rectangular cross rail 61 disposed in a space surrounded by the upper and lower cross frames 157, 158 and the front and rear column main bodies 155a, 155b and supported to be movable in the X-axis direction; a cylindrical saddle 62 supported to be movable in the Y-axis direction in the cross rail 61; and a ram 63 supported to be movable in the Z-axis direction in the saddle 62, and the spindle 152 is attached to a tip portion of the ram 63 with its axis being set substantially horizontal.

Further, the machining table 155 is supported by a base table 65 to be turnable between a substantially vertical machining position facing the spindle 152 and a substantially horizontal preparatory position where a wide and long workpiece is attached/detached.

In this embodiment, the spindle 152 is supported by the machining unit 153 to be relatively movable in the X-axis, Y-axis, and Z-axis directions, and the machining unit 153 is supported by the bed 154 to be movable in the U-axis direction parallel to the X-axis direction, so that load of the spindle 152 on the machining unit 153 when it moves in the X-axis, Y-axis and Z-axis directions can be reduced. This allows the spindle 152 to move at high speed, which accordingly can reduce the machining time. Therefore, the same effects as those of the above-described embodiment can be obtained.

Figure 17:
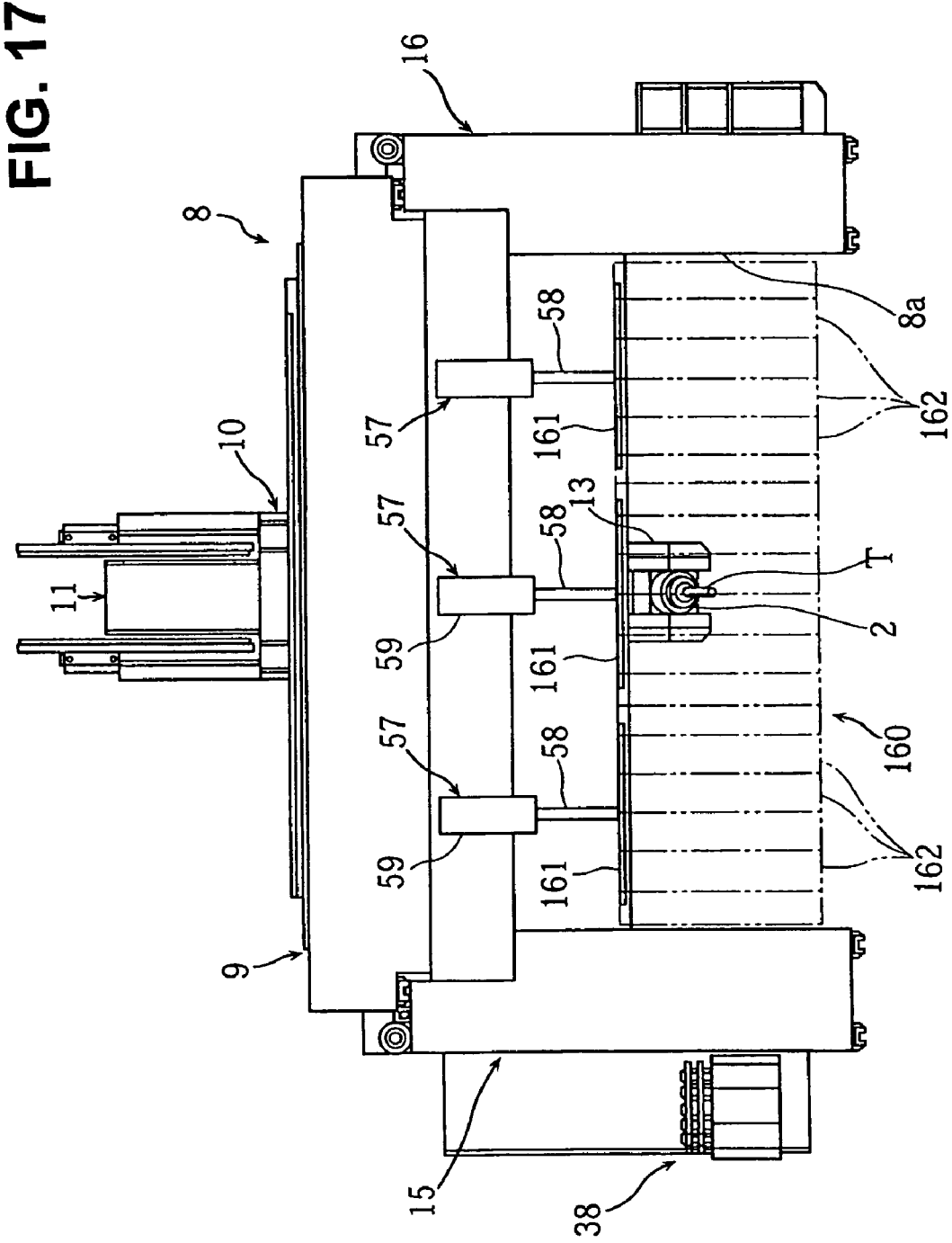
FIG. 17 is a front view of a machining unit according to a third embodiment of the present invention.

FIG. 17 is a view to describe shielding members according to a third embodiment of the present invention. The same reference numerals as those in FIG. 5 denote the same or corresponding portions.

A shielding mechanism 160 of this embodiment is structured such that three cylinder mechanisms 57 are arranged between left and right column main bodies 15, 16 at predetermined intervals, piston rods 58 of the cylinder mechanisms 57 are fixed to stick members 161, and a large number of curtain plates 162 are hung from and supported by the stick members 161 to be vertically movable. Note that each of the cylinder mechanisms 57 is fixedly attached to the cross frame 17 or 18.

The cylinder mechanisms 57 independently drive the curtain plates 162 via the respective stick members 161 to move up/down between a closing position and an opening position. When the stick members 161 move down so that the curtain plates 162 abut on a workpiece, the curtain plates 162 stop at this abutting position. In this manner, the openings 8a, 8b can be shielded.

In this embodiment, the three cylinder mechanisms 57 independently drive the curtain plates 162 to move up/down, so that it is possible to open/close only a necessary portion of the openings 8a, 8b, which realizes higher operability when the present invention is applied to a large machine tool with a large opening area.

The invention may be embodied in other specific forms without departing from the spirit or essential characteristics thereof.

The present embodiments are therefore to be considered in all respects as illustrative and no restrictive, the scope of the invention being indicated by the appended claims rather than by the foregoing description, and all changes which come within the meaning and range of equivalency of the claims are therefore intended to be embraced therein.

What is claimed is:

1. A machine tool comprising:

a spindle with a tool attached thereto;

a machining unit by which said spindle is supported to be relatively movable in X-axis, Y-axis, and Z-axis directions; and a long bed which has a plurality of machining areas arranged in one direction and on which said machining unit is mounted, wherein said machining unit is movable in an arrangement direction of the machining areas, said machining unit is disposed on said bed to be bridged over a machining table and supports said spindle, said machining unit further including:

a gate-shaped column in which right and left column main bodies disposed on said bed are coupled by front and rear cross frames;

a cross rail having a rectangular shape in a plan view disposed between the front and rear cross frames and supported by the right and left column main bodies so as to be movable in at least one of the X-axis and Y-axis directions;

a cylindrical saddle supported to be movable in at least one of the X-axis and the Y-axis directions in said cross rail; and a ram supported to be movable in the Z-axis direction in the saddle, wherein said spindle is attached to a lower end portion of said ram, wherein the right and left column main bodies each have a substantially rectangular shape, wherein one of the right and left column main bodies has an access opening sized to allow access to an operator therethrough, wherein the other one of the right and left column main bodies has a tool change window provided in a portion facing a tool change position, and a tool change arm can automatically change a tool attached to said spindle to a subsequent process tool held by a tool magazine through said tool change window, and wherein said cross rail has left and right flange portions supported by guide rails provided on upper surfaces of said right and left column main bodies.

2. The machine tool according to claim 1, wherein said spindle is moved in the X-axis, Y-axis, and Z-axis directions while said machining unit is kept positioned in one of the machining areas, thereby machining a workpiece.

3. A machine tool comprising:

a spindle with a tool attached thereto;

a machining unit by which said spindle is supported to be relatively movable in X-axis, Y-axis, and Z-axis directions; and a long bed which has a plurality of machining areas arranged in one direction and on which said machining unit is mounted, wherein said machining unit is movable in an arrangement direction of the machining areas, said machining unit is disposed on said bed to be bridged over a machining table and supports said spindle, said machining unit further including:

a gate-shaped column in which right and left column main bodies disposed on said bed are coupled by front and rear cross frames;

a cross rail having a rectangular shape in a plan view disposed between the front and rear cross frames and supported by the right and left column main bodies so as to be movable in at least one of the X-axis and Y-axis directions;

a cylindrical saddle supported to be movable in at least one of the X-axis and the Y-axis directions in said cross rail; and a ram supported to be movable in the Z-axis direction in the saddle, wherein said spindle is attached to a lower end portion of said ram, wherein the right and left column main bodies each have a substantially rectangular shape, wherein one of the right and left column main bodies has an access opening sized for allowing an operator therethrough, wherein the other one of the right and left column main bodies has a tool change window provided in a portion facing a tool change position, and a tool change arm can automatically change a tool attached to said spindle to a subsequent process tool held by a tool magazine through said tool change window, wherein said cross rail has left and right flange portions supported by guide rails provided on upper surfaces of said right and left column main bodies, and wherein a portion of said cross rail extends below the upper surfaces of said right and left column main bodies.

4. The machine tool according to claim 3, wherein said spindle is moved in the X-axis, Y-axis, and Z-axis directions while said machining unit is kept positioned in one of the machining areas, thereby machining a workpiece.

* * * * *